Sept. 19, 1939.　　　　F. S. KINKEAD　　　　2,173,170
TELETYPEWRITER APPARATUS
Filed April 7, 1938　　　11 Sheets-Sheet 1

| FIG. 10 OR FIG.10A | FIG. 9 OR FIG.9A |
|---|---|
| FIG. 11 | FIG. 14 |
| FIG. 12 | FIG. 13 |

FIG. 16

INVENTOR
F. S. KINKEAD
BY
ATTORNEY

Sept. 19, 1939.　　　　F. S. KINKEAD　　　　2,173,170
TELETYPEWRITER APPARATUS
Filed April 7, 1938　　　11 Sheets-Sheet 2

INVENTOR
F. S. KINKEAD
BY
ATTORNEY

Sept. 19, 1939.  F. S. KINKEAD  2,173,170
TELETYPEWRITER APPARATUS
Filed April 7, 1938   11 Sheets—Sheet 3

FIG. 9

INVENTOR
F. S. KINKEAD
BY
ATTORNEY

Sept. 19, 1939.　　F. S. KINKEAD　　2,173,170
TELETYPEWRITER APPARATUS
Filed April 7, 1938　　11 Sheets-Sheet 4

FIG. 9A

Sept. 19, 1939. F. S. KINKEAD 2,173,170
TELETYPEWRITER APPARATUS
Filed April 7, 1938 11 Sheets-Sheet 5

INVENTOR
F. S. KINKEAD
BY John A. Hall
ATTORNEY

Sept. 19, 1939.  F. S. KINKEAD  2,173,170
TELETYPEWRITER APPARATUS
Filed April 7, 1938  11 Sheets-Sheet 7

FIG. 11

INVENTOR
F. S. KINKEAD
BY
John Axtall
ATTORNEY

Sept. 19, 1939.     F. S. KINKEAD     2,173,170
TELETYPEWRITER APPARATUS
Filed April 7, 1938     11 Sheets-Sheet 11

*FIG.15*

| . 8C 8D | ; 9D 8D 8C 2D 2C | / 5D F9 F8 | LETTERS | M | V 9D 8E 8C E5 F2 F1 | X 5D F10 F9 F8 F7 | LETTERS | 9G 8D 7D 6D F6 F1 |
|---|---|---|---|---|---|---|---|---|
| , 9D 8C 8D | : 8D 8C 2D 2C | ! E1 F3 | ( 9C 9B 1C 1B F3 | N 5D F10 F7 F2 F1 | C 8G 2G E2 F5 F4 F1 | F 1G F6 F4 F1 | K 5D 5C 5B F10 F8 F1 |
| STOP 8E 8C 7F 7B F3 | 0 5D E2 F5 F4 F2 F1 | 6 7A 6A 5A 2G F11 | 1 9E 9C 2C F3 | H F6 F2 F1 | P 8D 7D F12 6D F6 F4 F1 | Y 8D 7D 6D 5D F8 F7 | Q E2 F10 F5 F4 F2 F1 |
| SPACE | 8 E3 F6 F5 F4 F2 F1 | BELL | 7 5D 1G F9 F8 F4 | SPACE 5D | I 9E 9C 1E 1C F3 | S 2G F11 | U 1G 1A E2 F5 F2 F1 |
| 9 5G 4G 3G 2G F11 | & 7D 6D 4D 3D F6 | ? 9D 6D 5D E3 F8 F4 | FIGURES 3D 2D 1G F6 F4 F1 | 0 E2 F5 F4 F2 F1 | G 2G F10 F5 F4 F1 | B E1 F6 F5 F4 F2 F1 | FIGURES |
| CARRIAGE RETURN 7D 6C 5G 4C 3D F6 | 4 5A 4A 3B 2C F6 F3 | $ 8D 7D 2G F11 F3 | , 3D 2D 2C | CARRIAGE RETURN 7D 6C 5G 4C 3D F6 | R F12 F10 F6 F4 F2 F1 | D 5G E1 F5 F4 F2 F1 | J 8A 1G E2 F5 F2 |
| 5 5A 1G 1A F11 | ) 9F 9E 1F 1E F3 | " 3F 3D 2F 2E 2D 2C | 2 9G E3 F9 F8 F5 F4 | T 1G 1A F4 F3 | L 9G F5 F1 | Z 5D F9 F8 F5 F4 | W 5D F10 F9 F2 F1 |
| BLANK 9D 5G 5D 5A 1D | LINE FEED | 3 3F 3B 2E 2C F3 | 8A E3 F6 F5 F4 F2 | — F6 | BLANK 9D 5G 5D 5A 1D | LINE FEED 3F 3B 2E 2C F3 | E 9G 1G F6 F5 F4 F1 | A 2E 2C E4 F6 F2 F1 |

INVENTOR
F. S. KINKEAD
BY John A. Hall
ATTORNEY

Patented Sept. 19, 1939

2,173,170

UNITED STATES PATENT OFFICE 2,173,170

TELETYPEWRITER APPARATUS

Fullerton S. Kinkead, New York, N. Y., assignor to Bell Telephone Laboratories Incorporated, New York, N. Y., a corporation of New York Application April 7, 1938, Serial No. 200,665

10 Claims. (Cl. 178—23)

This invention relates to teletypewriter apparatus and circuits therefor, and particularly to improvements leading to decreased bulk, increased portability and greater aesthetic appeal.

Heretofore the commercial teletypewriter instruments although well designed have been appreciably bulky by virtue of the apparatus necessary, so much so that when used as switching exchange accessories they have handicapped the switchboard designers by limiting the available space for line and trunk appearances over the space available in other similar switchboards such as those used in modern manual telephone exchanges. Attempts have been made in such situations to reduce the size of the teletypewriter instrument to gain more jack space and a notable example of such an effort may be seen in Patent No. 2,110,286, based on application Serial No. 94,909, filed August 8, 1936, by Alfred A. Burgess. Such prior efforts, however, generally embodied redesign and relocation of the component parts within the unit placed before the operator, and failed to solve the problem in a completely satisfactory manner due to the irreducible size of such component parts. For this reason also the subscriber's instrument such as is used in a business office has never become a truly portable and fairly inconspicuous device, or one which could be handled as roughly, let us say, as a modern portable typewriter.

An object of the present invention is, therefore, to reduce the dimensions of the teletypewriter to practically those of a keyboard and a very simple message viewing means and this is accomplished by placing the impulse transmitter and receiver at a remote point where bulk is not a serious consideration.

A feature of the invention is the location of a minimum number of components before a subscriber or operator and by the same token the location of a maximum number of components at a remote point where they may be sturdily mounted and made easily accessible for inspection and repair. Another feature is the use of a plug and jack arrangement whereby the near and remote components may be made quickly separable or whereby the near components may be temporarily placed in different locations as, for instance, different desks in a business office.

According to another feature the message viewing device consists of a printer of minimum dimensions and number of parts and which is of simple and sturdy design and of practically noiseless operation. As an example such a printer may consist of a bank of points which may be selectively controlled from a distant point to form various letters and useful characters on a tape by inked ribbon means, electrochemical action, indentation, perforation or any other desirable means.

In accordance with another feature of the invention there is provided a receiver which responds to impulses sent in code, and translates them into another code for selectively operating a message viewing device. This feature may be viewed from another aspect—that of means responding to a code determined by sequentially operating elements translated into a code determined by simultaneously operating elements to operate composite elements which in turn record characters for visual display. In accordance with this feature the composite elements for recording the various characters are placed within the portable instrument and operated from a distant point.

In its broad aspects the feature above mentioned whereby a sequence code operates a means to translate such code into another code for the simultaneous operation of selectively operable means for building up characters and so forth through composite elements is disclosed and claimed in my application Serial No. 200,666, filed on even date herewith, since this feature has utility in a much broader field than that disclosed herein.

The drawings consist of eleven sheets, two of which contain various views of mechanical details, eight of which contain circuit diagrams and the last of which contains a chart.

Figs. 9 to 14, inclusive, and Figs. 9A and 10A are circuit diagrams which, when placed according to Fig. 16, show in diagrammatic form two forms of the invention;

Fig. 10A shows a device which may be placed at a distance and operated by the keyboard of Fig. 9A. The keyboards of Figs. 9 and 9A differ in that in the first instance each key operates a separate contact and the permutation code is made up at a distant point, whereas in Fig. 9A each key operates one or more code bars so that the permutation code is made up locally and operates a cam arrangement of Fig. 10A at a distant point;

Figures 2, 16:
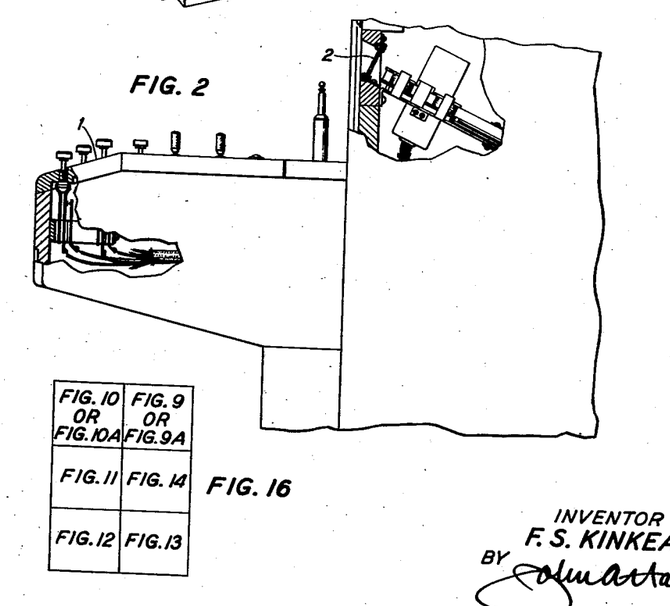
Fig. 2 is a sectional view of a detail of the switchboard shown in Fig. 1.

It is contemplated that a small size portable teletypewriter having both a keyboard and a message viewing device will be used at one point so as to both send and receive messages and that messages being sent will go out over a line and messages being received will come in over the same line from a distant point where a teletypewriter of usual design, or, alternatively, a teletypewriter of the design herein shown, is employed. For the sake of simplicity, however, and since the interconnecting circuits are well known, the circuit shown herein is in the form of a loop, that is, it is arranged so that the keyboard is employed for sending trains of permutation code impulses through the various circuits as indicated in Fig. 16 and that these same impulses will be instrumental in operating the composite printer at the same point. Actually, other circuits will be used so that when a message is sent out over a line means will be provided for making a so-called local copy. It is believed that simplicity is attained by showing the circuits in this manner, since it is only necessary to explain herein how the components of the small size teletypewriter operate.

Figure 1:
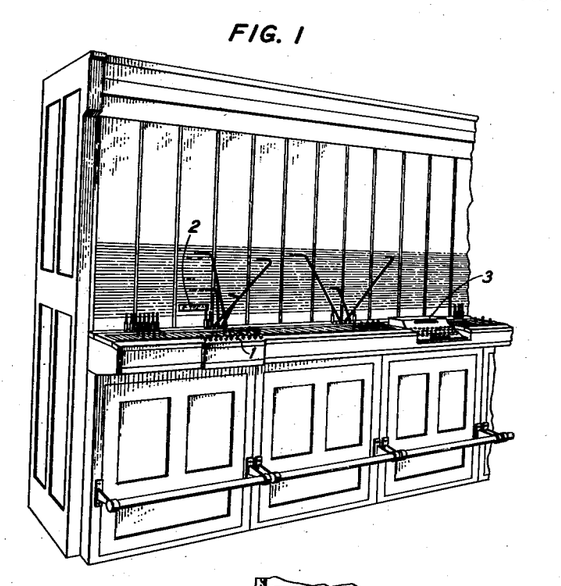
Fig. 1 is a perspective view of a switchboard adapted for use as a teletypewriter exchange.

It is contemplated that most of the apparatus for the teletypewriter will be placed at a distant point where it may be rigidly mounted and made easily accessible for maintenance and repair. Consequently, only certain necessary parts are put before the operator. In Fig. 1 this is shown in two alternative arrangements. There is a keyboard 1 which may be incorporated in and become part of the key-shelf used by the operator. The message viewing device 2 may be placed in the jack space of the switchboard, directly above the line of plugs which are used in making connections from one teletypewriter subscriber to another. These two devices include only the minimum number of pieces of apparatus and consequently may be mounted in a small space and thus render the teletypewriter switchboard comparable to the ordinary and well-known type of manual switchboard in use today.

Figures 3, 4, 5:
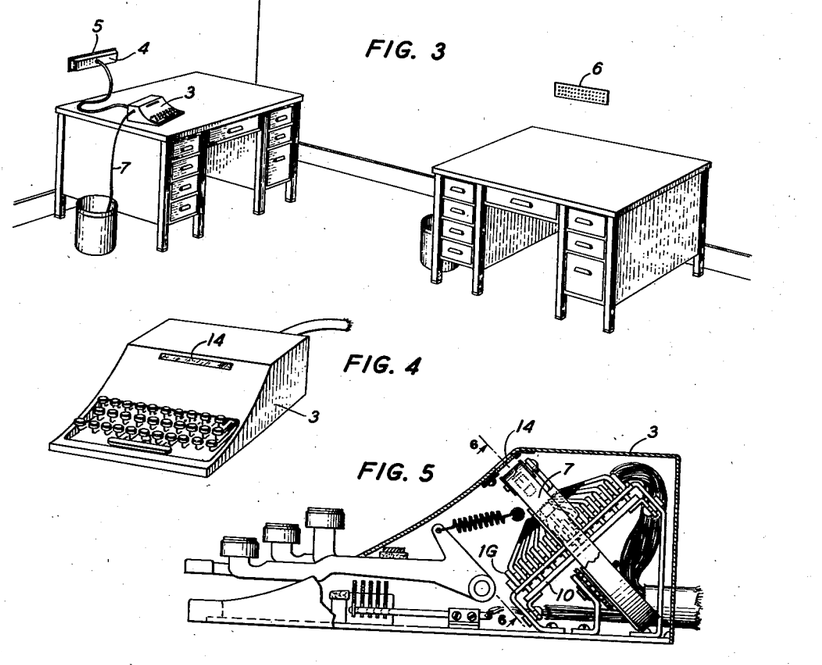
Fig. 3 is the representation of a business office showing how a small portable teletypewriter may be alternatively used in different places.
Fig. 4 is a representation of a portable teletypewriter indicating a machine of approximately the same size as an ordinary portable typewriter.
Fig. 5 is a sectional view of the portable teletypewriter.

In this same switchboard shown in Fig. 1 and at another position is indicated a teletypewriter 3, which is in the form of a small portable machine of Fig. 4.

Figure 9:
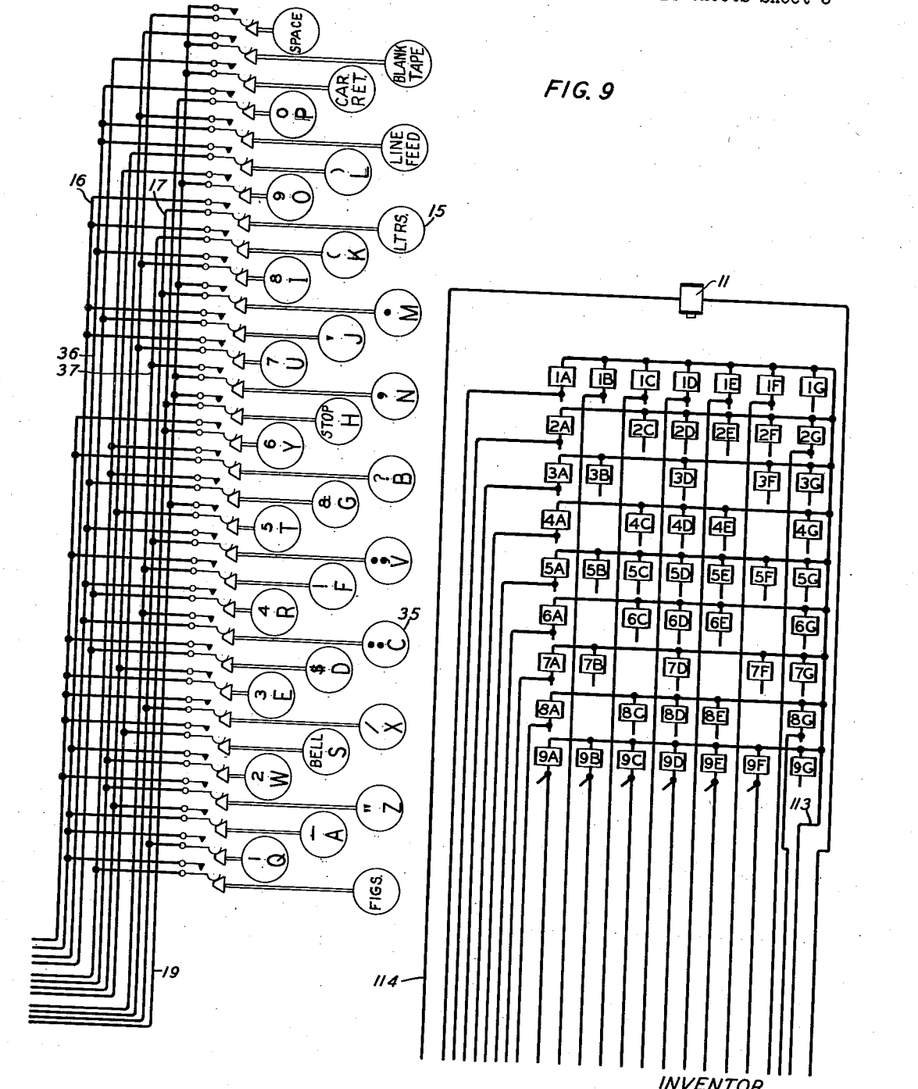
Fig. 9 shows the essential elements of a keyboard and composite printer which may be incorporated in the portable machine of Fig. 4 or in the keyboard and switchboard face of the switchboard of Fig. 1.

The keys 1 and the composite printer 2 may be provided with circuit arrangements such as Fig. 9 and permanently wired to their distant cooperating apparatus. The teletypewriter 3 may be either of the same nature and permanently wired or it may be of the nature shown in Fig. 9A and made removable through a plug-and-jack arrangement so that should trouble occur, the defective unit may be very quickly replaced by a spare unit.

In Fig. 3 a business office is indicated with a portable teletypewriter 3 connected through a plug 4 and jack 5 which is in multiple with jack 6, before another desk. This is so the occupant of the left-hand desk may use the teletypewriter for a certain period and then place it on the desk of his co-worker in the right-hand position.

Figures 6, 7, 8:
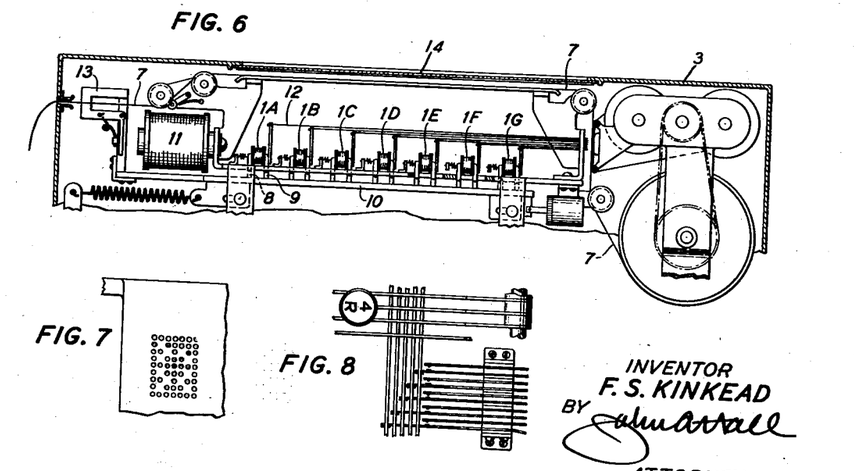
Fig. 6 shows the mechanical arrangement of what may be termed the selecting magnets and the striking magnet, showing how a composite printer may be organized and operated in the small space provided in the portable size teletypewriter.
Fig. 7 is a representation of a striking plate or platen, or a punch plate, showing how the various selecting rods are placed so that the various characters may be properly formed.
Fig. 8 is a detail showing how the various keyboard bars may cross a set of five code bars, each of which is provided with a contact.

Fig. 5 shows a sectional view of the portable teletypewriter 3 and indicates a record printed on the tape 7 by means of apparatus shown more in detail in Fig. 6. Here there are a number of magnets designated 1A, 1B, 1C, 1D, 1E, 1F and 1G. Each of these magnets, such as 1A, is wound around a U-shaped piece of magnetic material having two poles 8 and 9. When the magnet 1A is operated, therefore, these pole-pieces become attracted to a plate 10, which is movable toward the right, by magnet 11. When, under appropriate circumstances, magnet 11 is moved, then a pin 12 of small dimensions is pushed toward the right. There are as many pins like 12 provided as there are spaces indicated in Fig. 7 and they are arranged in the same relative physical positions. These pins may be employed in connection with a device, such as Fig. 7, having accurately cut holes for punching a tape so that a character may be formed by an appropriate number of perforations. The pins may have an electrical potential connected to them and merely press their right-hand ends against a chemically prepared tape so that printing is done by electro-chemical means. They may alternatively press an inked ribbon against the tape so that characters may be printed as in a typewriter. Or they may merely indent a tape through cooperation with a series of depressions placed as in Fig. 7. The actual means used is immaterial as all of these various methods are well known in the art and it is only necessary here to indicate how the printing may be done in general terms.

It may be also mentioned that the magnet 11 may be arranged to pull the pins 12 away from the tape 7 so that upon the deenergization of magnet 11 they will, in snapping back to their normal position, carry over sufficiently far to properly form a character on tape 7.

It will be noted that a clutch arrangement 13, operated by magnet 11, will advance the tape 7 after each character has been printed so that the tape will travel in a left-hand direction before the window 14 in view of the operator.

Figure 10:
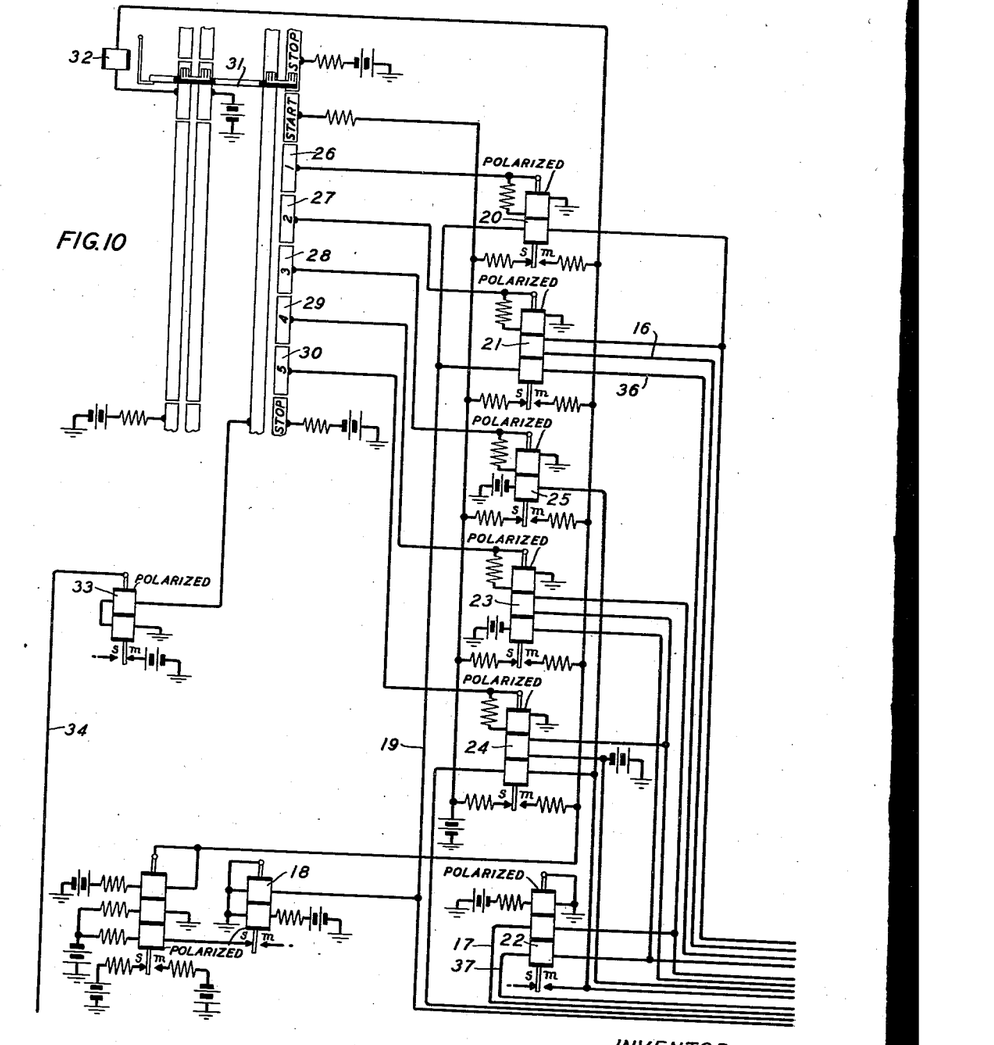
Fig. 10 shows the apparatus operated by the keyboard of Fig. 9 but which is placed at a distant point where it may be rigidly mounted and made accessible for inspection and maintenance.

Permutation code impulses may be set by a keyboard, such as that shown in Fig. 9, in cooperation with the apparatus shown in Fig. 10 and which is located at a distant point. Let us assume that the code for "letters" is to be sent. The key 15 will be depressed and will close a contact between conductors 16 and 17. This will close a circuit from ground, upper winding of relay 18, conductor 19, lower winding of relay 20, middle winding of relay 21, conductor 16, the set of contacts operated by key 15, conductor 17, middle winding of relay 22, middle winding of relay 23, middle winding of relay 24 to battery. Relay 22 in operating will place ground through its armature and contact, through the lower winding of relay 25 so that it will be noted now that relays 20, 21, 25, 23 and 24 are all operated by the depression of key 15. Since the armatures of these five relays are connected to segments 26 to 30, inclusive, respectively, a marking condition will be placed on each of these segments so that as the brush indicated generally by the character 31 is released by the stop magnet 32 and makes a revolution, the relay 33 will be caused to send a series of five consecutive marking impulses out over the line 34.

In a similar manner, if the key 35 is depressed to send the code for the letter C then a contact is closed to make a connection between conductors 36 and 37, whereupon a circuit will be established from ground, the upper winding of relay 18, conductor 19, the lower winding of relay 21, the lower winding of relay 17, the lower winding of relay 23 to battery. Relay 17, as before, causes the energization of relay 25 so that now the relays 21, 25 and 23 are energized, with the result that as the brush 31 travels over the segments 26 to 30, inclusive, it will send out a spacing impulse as it passes over segment 26, three consecutive marking impulses as it passes over segments 27, 28 and 29, and a spacing impulse as it passes over segment 30.

Figure 9A:
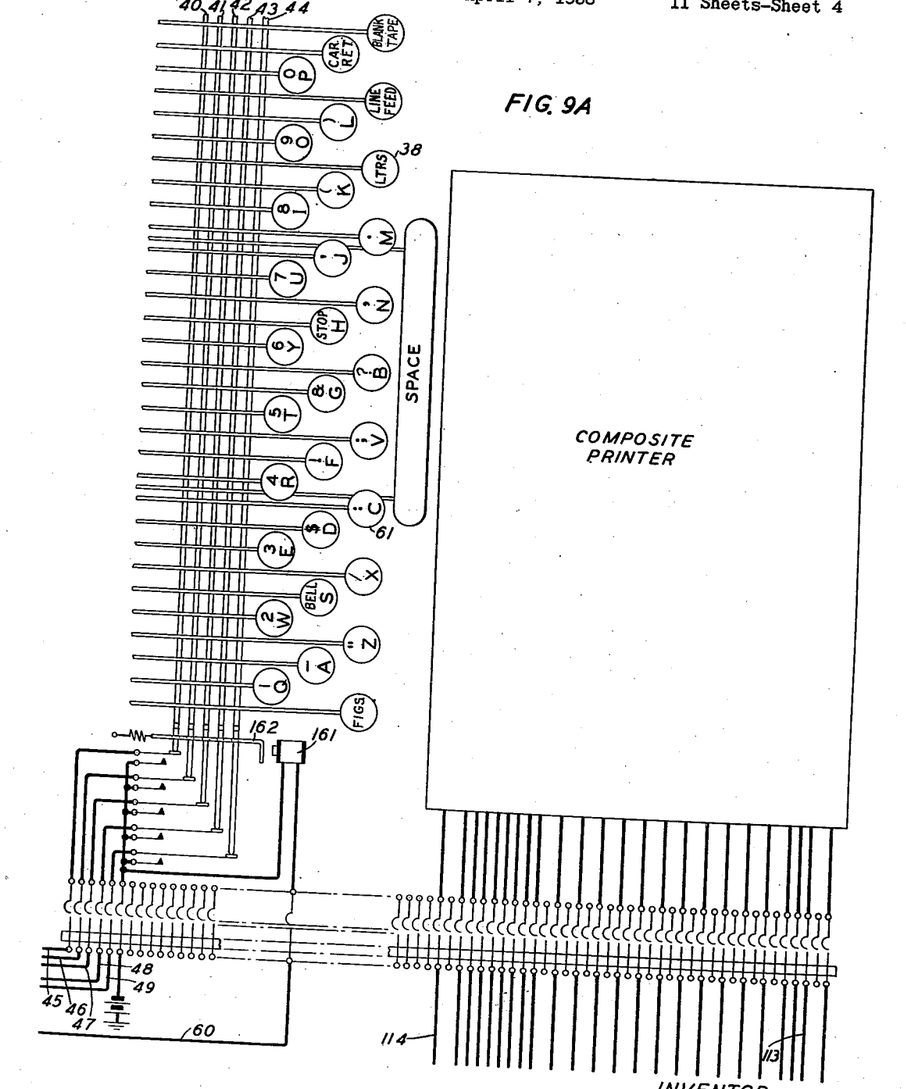
Fig. 9A shows a similar keyboard and composite printer and indicates how these elements may be terminated in plugs so that they, as a unit, may be moved from place to place where appropriate outlets are provided.
Figure 10A:
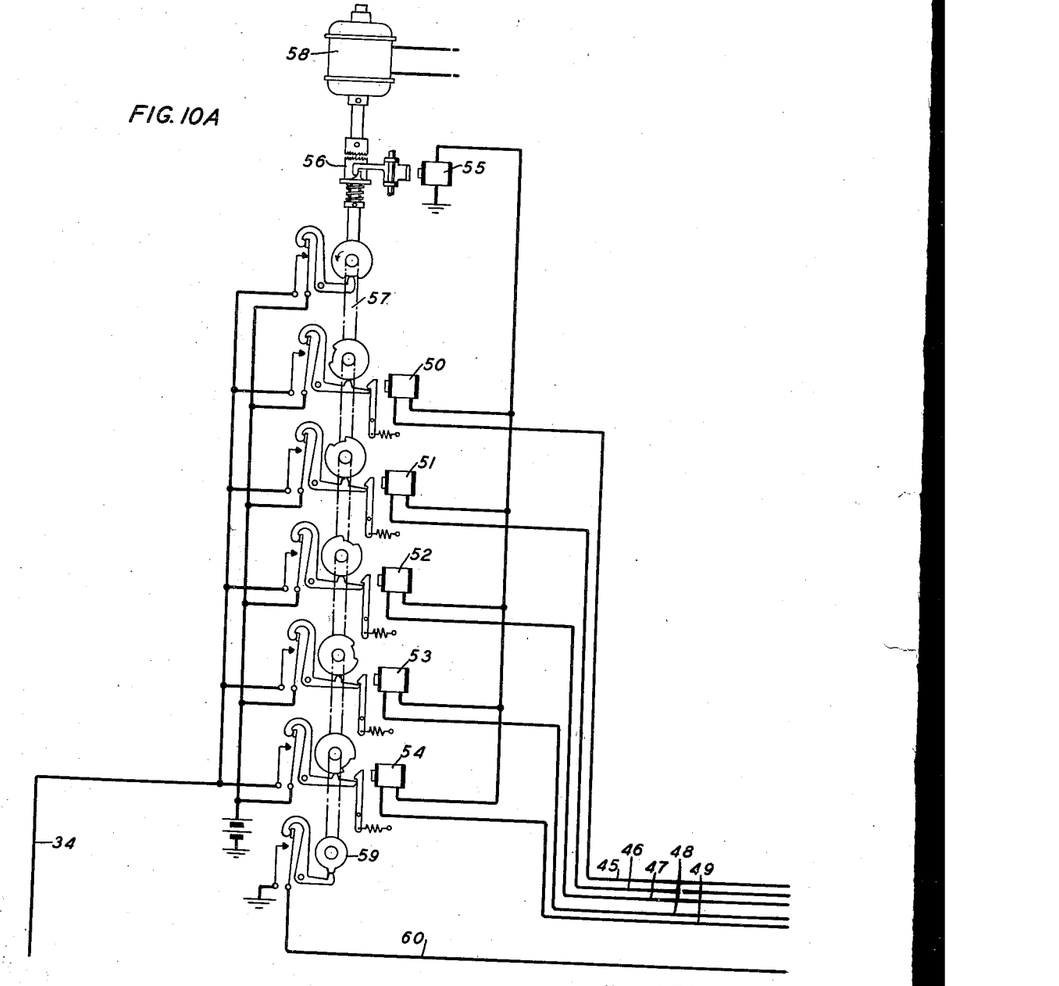

If the key board of Fig. 9A and the cam arrangement of Fig. 10A are used the operation will be as follows: If the code for "letters" is to be sent, then key 38 is depressed and this will result in the movement of all five code bars 40 to 44, inclusive, and the consequent closure of each of the contacts controlled thereby so that battery is connected to each of conductors 45 to 49, inclusive. Current from this connection will flow through each of the magnets 50 to 54, inclusive, through the start magnet 55 and thence to ground. This will release the clutch 56 so that the shaft 57 may be operated by the power source 58. As the shaft 57 begins to rotate, cam 59 turning in a counterclockwise direction closes a circuit from ground, conductor 60, magnet 161 to battery. Magnet 161 operates a bar 162 to drop into a notch in each one of the code bars 40 to 44 to hold the code bar in this position until the permutation code has been completely sent by the apparatus of Fig. 10A. In this particular case, the bar 162 will lock all five of the code bars in their operated position.

Since the device of Fig. 10A is well known, it is only necessary here to state that one complete revolution of the shaft 57 is made and that five consecutive marking impulses are sent out over the line 34.

In case the letter C is to be sent, the key 61 is depressed and the code bars 41, 42 and 43 are operated. In this case, a train of permutation code impulses consisting of one spacing impulse, followed by three marking impulses, in turn followed by a single spacing impulse is sent out over conductor 34.

Figure 11:
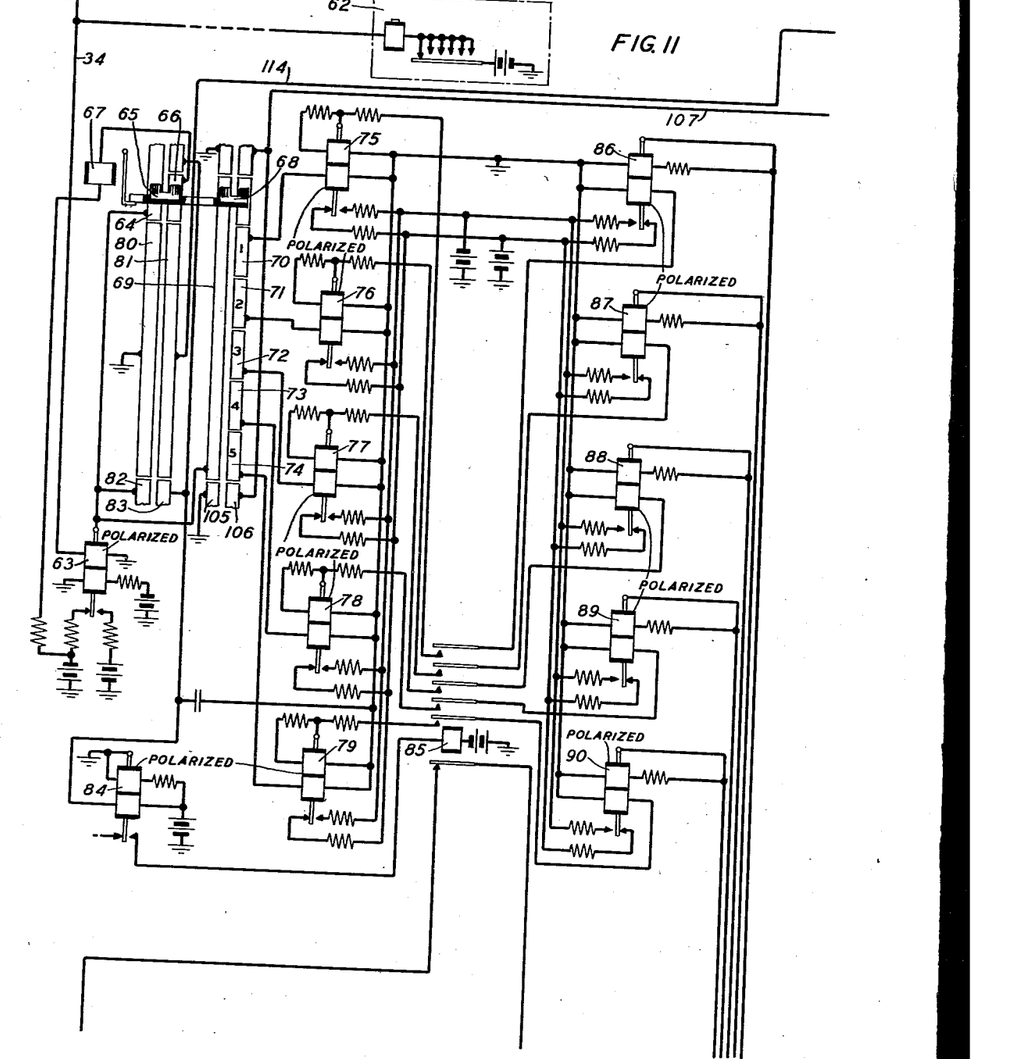
Fig. 11 shows a start-stop distributor, a set of receiving relays and a set of transfer relays for receiving a permutation code from a distant point.

Now, for the sake of simplicity, it will be assumed that permutation code impulses are sent out on conductor 34 by a teletypewriter machine conventionally illustrated in box 62 (Fig. 11). These impulses operate relay 63. Since the first impulse in every train of impulses is a spacing impulse, relay 63 at this time will be moved to its right-hand or spacing position, whereupon a circuit will be established from positive battery, right-hand contact and armature of relay 63, segment 64, brush 65 and segment 66 through start magnet 67 to negative battery. Magnet 67 allows brush 65 to start on a movement which will be completed when it returns to the position here shown. This movement will correspond in speed to the movement of a similar synchronous distributor or set of cams like those shown in Fig. 10A and during this movement brush 68 will in turn connect segment 69 to each of segments 70 to 74, inclusive, respectively. According to where a marking impulse or a spacing impulse is being sent while brush 68 is on each of the segments 70 to 74, relays 75 to 79, inclusive, respectively, will be operated. After brush 65 has left segment 80 it will make a connection from negative battery, left-hand contact and armature of relay 63, segment 82, brush 65, segment 83, lower winding of relay 84 to battery and relay 84 in operating will cause the operation of relay 85. Relay 85 in operating will cause the operation of the transfer relays 86 to 90, inclusive, in accordance with the corresponding positions taken by the armatures of relays 75 to 79, respectively.

Thus if the permutation code for "letters" has been sent and each one of relays 75 to 79 has been operated, then each one of relays 86 to 90, inclusive, will operate and their armatures will be moved to their left-hand contacts.

If the code for the letter C has been recorded on the receiving relays 75 to 79, inclusive, then relays 76, 77 and 78 only of this set will be operated and they in turn will operate relays 87, 88 and 89 of the transfer relays.

Figure 12:
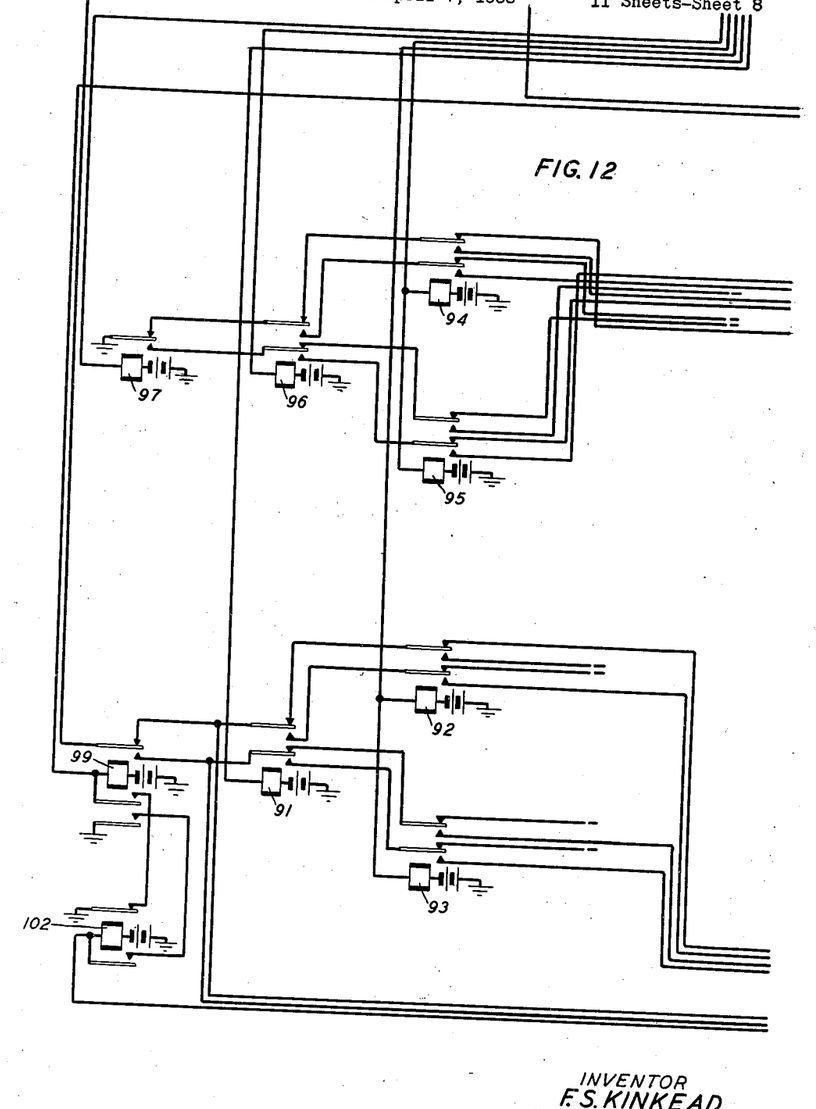
Fig. 12 shows a set of fanning-out relays responsive to the record made on the transfer relays of Fig. 11.
Figure 13:
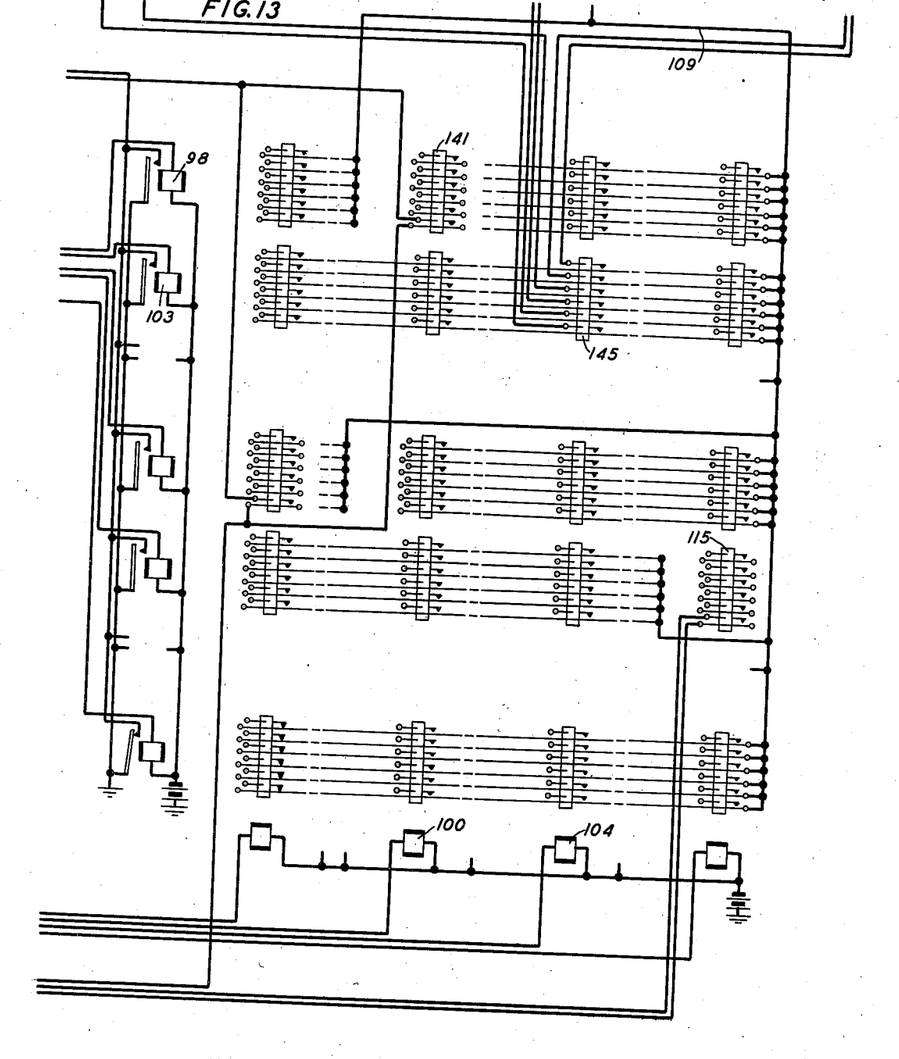
Fig. 13 shows a cross-bar or coordinate switch operated by the fanning-out relays of Fig. 12.

Relay 86 controls relay 91, relay 87 controls relays 92 and 93, relay 88 controls relays 94 and 95, relay 89 controls relay 96 and relay 90 controls relay 97. Consequently, if the code for "letters" has been sent all of relays 91 to 97, inclusive, will be operated. This will result in the establishment of a circuit from ground, the armature and front contact of relay 97, the inner armature and front contact of relay 96, the inner armature and front contact of relay 95, the winding of horizontal cross-bar magnet 98 to battery. Magnet 98 operates and prepares for operation all of the sets of cross-bar contacts in a corresponding horizontal row. Magnet 98 also closes a circuit from ground, its armature and front contact to the armature of relay 85 but this circuit is not continued until after the brush 65 leaves segment 80. When this happens this ground will be extended to the upper armature and back contact of relay 99, the upper armature and front contact of relay 91, the inner armature and front contact of relay 92, the winding of vertical magnet 100 to battery. Through the co-operation of horizontal magnet 98 and vertical magnet 100, the cross-bar set of contacts 141 is operated. This will result in a connection from ground on the upper armature and back contact of relay 99, the cross-bar set of contacts 141, winding of relay 99 to battery. Relay 99 locks through its inner lower armature and front contact and the back contact and upper armature of relay 102.

Relay 99 will remain in this locked condition now until the code for "figures" has been sent.

If now the code for the letter C is sent, then relays 92 to 96, inclusive, will be operated. Through the operation of relays 94 and 96 a circuit will be established from ground, the armature and back contact of relay 97, the upper armature and front contact of relay 96, the inner armature and front contact of relay 94, winding of magnet 103 to battery. Through the energization of magnet 103 ground is placed on the upper armature of relay 99 when it is extended over this armature and its front contact, the inner armature and back contact of relay 91, the upper armature and front contact of relay 93, winding of vertical magnet 104 to battery. Through the cooperation of horizontal magnet 103 and vertical magnet 104 the set 145 of cross-bar contacts is operated.

After the brush 68 has left segment 69 it makes a connection from ground, segment 105, brush 68, segment 106, conductor 107, winding of relay 108 to battery. When brush 68 returns to its normal position this circuit is broken and relay 108 returns to normal. At this time it establishes a connection from ground, lower armature and back contact of relay 108, conductor 109 and thence through each of the contacts in set 145 to the various relays of Fig. 14 and the magnets of Fig. 9 or 9A. In accordance with the chart (Fig. 15) magnets 8G and 2G are energized and relays E2, F5, F4 and F1 are energized. Following up the circuits through each of these relays it will be noted that relay F1 will energize magnets 1A to 9A, inclusive, that is, relay F1 controls a standard downward stroke at the left-hand side of the figure, which stroke might be standard of such letters as B, C, D, E, F, etc. Relay F4 energizes magnets 1B, 1C, 1D, 1E and 1F, which form a standard stroke useful in such letters as C, D, E, F, T, etc. Relay F5 energizes magnets 9B, 9C, 9D, 9E and 9F which form a corresponding stroke at the base of the letters. However, the letter C which we are now forming should be somewhat rounded at the corners and hence the relay E2 is energized to subtract the corner magnets 1A and 9A, with the result that the magnets now energized will be as follows: 2G, 1F, 1E, 1D, 1C, 1B, 2A to 8A, inclusive, 9B, 9C, 9D, 9E, 9F and 8G.

Figure 14:
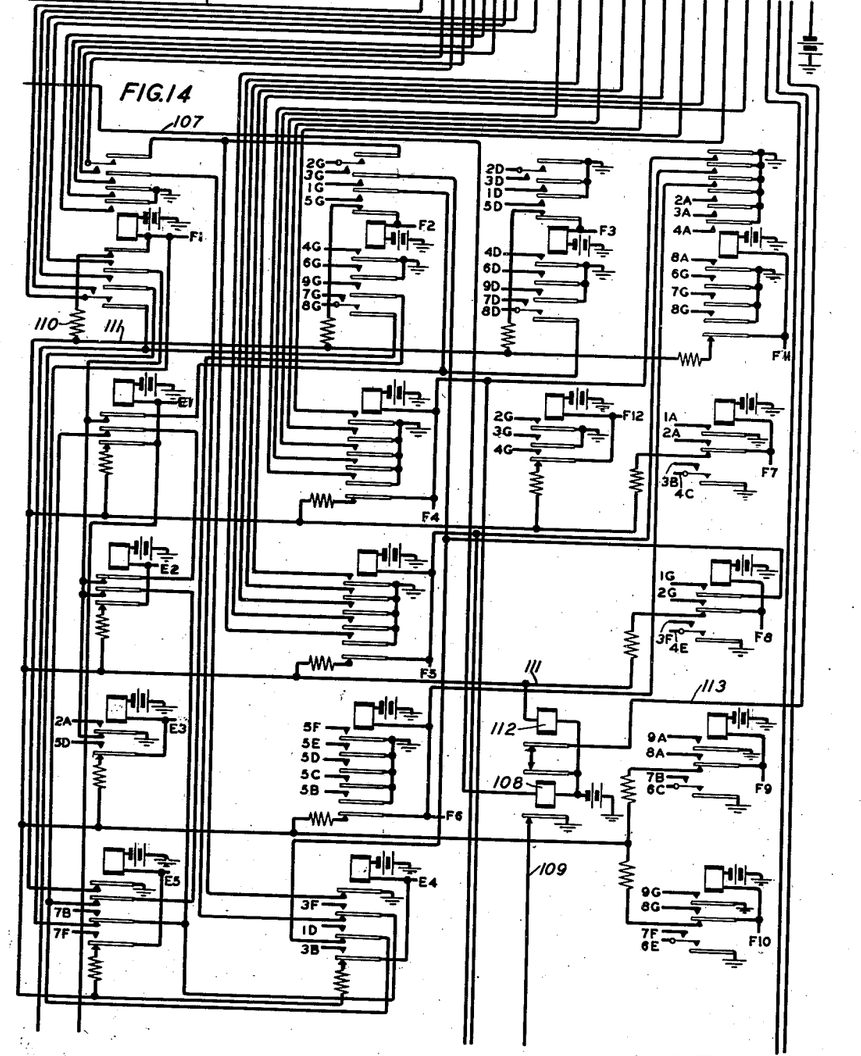
Fig. 14 shows a set of composite character forming relays operated selectively through the agency of the cross-bar switch of Fig. 13.

When the ground is placed on the windings of relays F1, F4, F5 and E2, this ground is extended through an armature and back contact of each of these relays through a resistance such as 110 to conductor 111 which extends through the winding of relay 112 to battery so that it is not until each of the relays designated by the particular code being sent has been fully energized that relay 112 is allowed to resume its normal position. When relay 112, therefore, returns to normal the ground supplied to the individual leads of the magnets to be energized is connected through such magnets to the common conductor 113 which extends through the armature and back contact of relay 112 and the back contact and upper armature of relay 108 to battery, thus energizing the magnets picked out by the particular code sent.

When the operator at teletypewriter 1 sends another code the impulse will be written on relays 75 to 79, inclusive, and while brush 68 is helping to write up this new code brush 65 is completing a connection from ground, segment 80, brush 65, segment 81, conductor 114, magnet 11 to battery. Hence, a previous character is printed while a succeeding character is being written up on the relays 75 to 79, inclusive. As soon as brush 68 leaves segment 69 and brush 65 leaves segment 80 magnet 11 will become deenergized and through the energization of relay 108 the various magnets of Fig. 9 will become deenergized getting ready for the operation of a new set under the influence of the transfer relays 86 to 90, now being energized.

Figure 15:
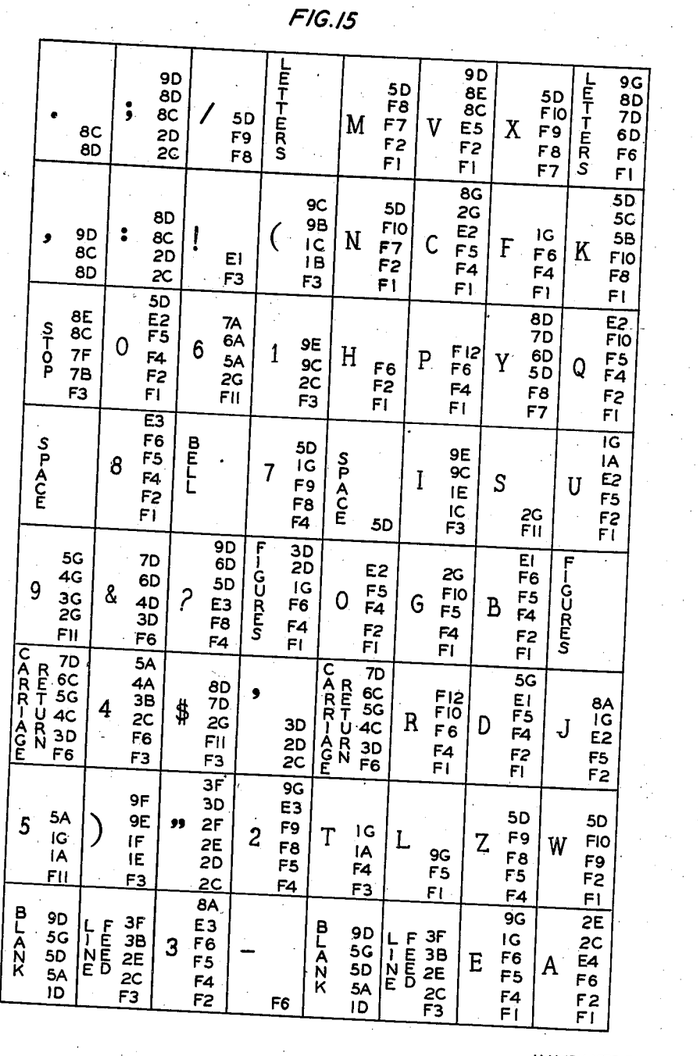
Fig. 15 is a chart showing the composite character forming relays and the various individual magnets which are operated by each set of contacts on the cross-bar switch.

If it is wished to record any of the characters shown in the first four vertical columns of the chart in Fig. 15, the code for "figures" is sent, whereupon the contacts of set 115 of the cross-bar switch in Fig. 13 are closed so that relay 102 now becomes energized. Relay 102 locks through its lower armature and front contact to the front contact and lower armature of relay 99. This opens the locking circuit of relay 99 and therefore relay 99 returns to normal and relay 102 in turn becomes deenergized. Thereafter any code for any one of the figures shown may be sent and will result in the energization of a corresponding particular set of contacts on the cross-bar switch.

What is claimed is:

1. A teletypewriter comprising a unit including only a keyboard and a message viewing device, and at a point remote therefrom and electrically connected thereto permutation code sending means immediately responsive to said keyboard for transmitting messages to a distant point and permutation code receiving means for receiving messages from a distant point and immediately operating said message viewing device.

2. A teletypewriter as claimed in claim 1 wherein said keyboard comprises a bank of keys each controlling a single make contact, said single make contacts being connected to said remote permutation code sending means in such manner as to cause said means to send a code corresponding to an operated key.

3. A teletypewriter as claimed in claim 1 wherein said keyboard comprises a bank of keys, a set of permutation bars selectively controlled by said keys and a single make contact controlled by each of said permutation bars, said single make contacts being connected to said remote permutation code sending means in such manner as to cause said means to send a code corresponding to an operated key.

4. A teletypewriter as claimed in claim 1 wherein said permutation code receiving device includes means sequentially operable and responsive to a train of permutation code impulses, means simultaneously operable and responsive to said last means and means responsive thereto for operating said message viewing device.

5. A teletypewriter as claimed in claim 1 wherein said permutation code receiving device includes means operable sequentially and responsive to a train of permutation code impulses, a coordinate switch selectively operable thereby and means under control of said coordinate switch for operating said message viewing device.

6. A teletypewriter as claimed in claim 1 wherein said message viewing device comprises a composite character forming device and means under control of said permutation code receiver for simultaneously operating the elements of said composite character forming device.

7. A teletypewriter comprising a unit including a keyboard comprising a bank of keys each controlling a single make contact and a message viewing device, and at a point remote therefrom and electrically connected thereto permutation code sending and receiving means, said permutation code sending device including a set of relays less in number than said keys and selectively operable by said contacts.

8. A teletypewriter comprising a unit including a keyboard and a message viewing device and at a point remote therefrom and electrically connected thereto a permutation code sending device controlled by said keyboard and a permutation code receiving device for controlling said message viewing device.

9. A teletypewriter comprising a unit including a keyboard and a message viewing device, a permutation code sending device controlled by said keyboard, a permutation code receiving device for controlling said message viewing device, said unit being at a point remote from said permutation code devices, and electrical connections between said unit and said permutation code devices.

10. A teletypewriter comprising a unit including a keyboard and a message viewing device, a permutation code sending device controlled by said keyboard, a permutation code receiving device for controlling said message viewing device, electrical connections from said permutation code devices terminating in multiple connection means and electrical connections from said unit terminating in devices cooperable with said multiple connection means.

FULLERTON S. KINKEAD.